United States Patent Office 3,499,058
Patented Mar. 3, 1970

3,499,058
MIXTURE OF TWO POLYESTERS WITH PYROMELLITIC DIANHYDRIDE
Martin H. Kaufman, China Lake, Calif., assignor to the United States of America as represented by the Secretary of the Navy
No Drawing. Filed Apr. 22, 1966, Ser. No. 545,802
Int. Cl. C08g 17/04
U.S. Cl. 260—860                                          1 Claim

ABSTRACT OF THE DISCLOSURE

Novel polymeric resins prepared from polyesters, polyesteramide and cyclic anhydrides which can be compounded to form products having predetermined physical properties varying from soft and flexible to hard and tough.

---

The invention described herein may be manufactured and used by or for the Government of the United States of America for governmental purposes without the payment of any royalties thereon or therefor.

The present invention relates to novel polymeric resins and to the preparation thereof; and more particularly to polyester and polyesteramide prepolymers having regularly spaced active sites of unsaturation along the polymer chain which facilitate orderly crosslinking.

Unsaturated polyesters and polyesteramides are types of thermosetting synthetic resins available with a great variety of properties making them valuable for impregnating, laminating, etc. Linear polyesters are produced by the esterification of polybasic organic acids with polyhydric alcohols; linear polyesteramides, by the condensation of a dibasic carboxylic acid with a mixture of a glycol, an amino alcohol and/or a diamine. In general they cure by reaction of the carbon-carbon double bond which is located at random along the polymer chain. In the cured state they have high strength and excellent resistance to moisture and chemicals. The present invention provides novel polyester and polyesteramide polymers having crosslinking sites or points of unsaturation regularly spaced along the length of the polymer chain and the method of preparation. These tailor-made polymers have good structure and improved physical properties over the known polyester and polyesteramide polymers which have their points of unsaturation distributed at random along the chain lengths. When the prepolymers of this invention are compounded with unsaturates a well-ordered three-dimensional network results thereby providing products with superior physical properties.

It is therefore an object of the present invention to provide prepolymers having regularly spaced crosslinking sites along the polymer chain for compounding casting resins.

Another object is to provide a versatile prepolymer which has good storage and processing qualities.

Yet another object is to provide a method for producing polyester resins with predetermined physical properties varying from soft and flexible to hard and tough for use as binders in solid propellant systems.

A further object is to provide a prepolymer with a rate of cure which may be varied over a large range of time thereby lowering the cost of processing the final product.

A still further object is to provide a polyester or polyesteramide prepolymer which will react with a variety of curing agents to produce a product of predetermined physical properties.

Other objects, features and many of the attendant advantages of this invention will become readily appreciated as the same become better understood by reference to the following detailed description.

In accordance with the present invention starting with a typical low molecular weight linear polyester, polyesteramide, and other type prepolymers, having an acid number ranging from 0 to 25 and a hydroxyl number ranging preferably from 40 to 130, a cyclic anhydride was added in an amount equivalent to the hydroxyl number of the prepolymer. The mixture was heated at an elevated temperature until all the hydroxyl groups were reacted. The resulting cyclic anhydride modified prepolymer had a chain length which was of substantially uniform and of well controlled length. The amount of anhydride reactant to hydroxyl groups is critical to this process.

This invention may be better understood by designating the prepolymers and segments of prepolymers by the symbol $$(-\!\!\sim\!\!\sim\!\!-)$$

while end groups are designated by their empirical chemical formula. A prepolymer with hydroxyl end groups is shown as $$(\mathrm{HO}\!-\!\!\sim\!\!\sim\!\!\sim\!\!-\!\mathrm{OH})$$

Amino is ($\mathrm{NH_2}$—), carboxy is

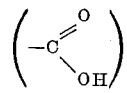

and unsaturation is designated (=). The relative length of prepolymer chain or segment thereof is designated by the length of $$(-\!\!\sim\!\!\sim\!\!-)$$

Thus a short chain (or segment of chain) may be designated by $$(-\!\!\sim\!\!\sim\!\!-)$$

and a long chain (or segment of chain) may be designated by $$(-\!\!\sim\!\!\sim\!\!\sim\!\!\sim\!\!-)$$

A prepolymer with acid end groups which are activated by unsaturation may be designated

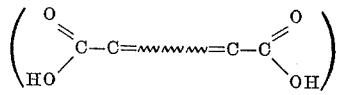

If a prepolymer with hydroxyl end groups has unsaturation randomly distributed along the chain length, the segments between points of unsaturation will be of random lengths. This may be symbolized by $$\mathrm{HO}\!-\!\!\sim\!\!\sim\!=\!\!\sim\!\!\sim\!=\!\!\sim\!\!\sim\!=\!\!\sim\!\!\sim\!\!-\!\mathrm{OH}$$

Since this invention substantially eliminates nonrandom crosslinking the above type symbol is useful in illustrating randomness or nonrandomness in crosslinking sites. In the usual linear unsaturated acid copolymer prepared with pendant acid groups the position of the carboxyl groups will be random and this may be symbolized by

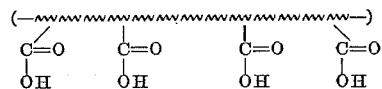

The network formed in compounding such a prepolymer with an agent which reacts additively with unsaturation can be symbolized in two dimensions.

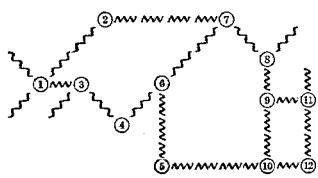

It is evident that the physical properties of such a network will vary since the cross-link sites, for instance, (1) through (12) are located in completely random positions.

Now, in the present invention the crosslinking sites are positioned in a more orderly fashion. In a reaction with an agent which reacts additively with carboxyl groups the network may be symbolized in two dimensions like this:

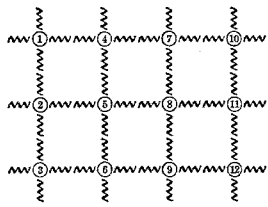

Thus a more ordered network is formed and the physical properties are improved as the structure becomes more and more symmetrical. It was found that unsaturation in positions alpha-beta to the carboxyl function activate the carboxyl and enhance its reactivity. Alpha-beta are positioned descriptions of carbon atoms attached to the carboxyl group. The alpha carbon is attached directly to the carboxyl carbon atom, the beta carbon is attached directly to the alpha carbon atom. Alpha-beta unsaturation means unsaturation between the alpha and beta atoms. This may be illustrated by the following symbols:

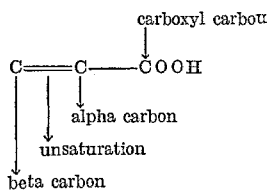

The prepolymers employed as starting materials for the present invention were linear polyesters, polyethers, polyesteramides, polyetherpolyesters, polyetheramines, hydroxy-terminated polyhydrocarbons, aminoterminated polyhydrocarbons and other linear prepolymers having substantially all of the end groups capable of reaction with anhydrides. The linear polyesters used herein are made from at least one saturated dicarboxylated acid or from a hydroxy carboxylic acid, optionally in a mixture with a small amount of an aromatic or unsaturated dicarboxylic acid, and at least one glycol, which may be in part a polyglycol or polyglycol optionally in mixture with a small amount of polyfunctional amine or an amino alcohol. Acids used include malonic acid, succinic acid, the methyl adipic acids, carbonic acid, dihydromuconic acid, thiodipropionic acid, diethylether-dicarboxylic acid, sebacic acid, suberic acid and higher dicarboxylic acids. Mixtures of acids and glycols can be used as well as mixtures of acids and amines and glycols whereby mixed polyesters or mixed polyesteramides or mixed polyesterethers are obtained. Other bifunctional reactants which are complementary to the acids or glycols can be used in amounts up to about 20% by weight of the respective acid or glycol. For example, compounds containing aromatic nuclei, such as phthalic acid or terephthalic acid, unsaturated dicarboxylic acids such as maleic acid, aromatic or aliphatic diamines, i.e., phenylenediamine, naphthylenediamines, piperazine, ethylenediamine amino alcohols, i.e., the aminopropanols and the hydroxyethylanilines.

The prepolymers used as starting materials need not be obtained exclusively from bifunctional reactants. The process is applicable also to such cases, in which apart from a predominating number of bifunctional components a slight amount of polyfunctional component is employed. For instance it is possible to work with polyesters which for every 27 molecules of a bifunctional alcohol contain one mole of a trifunctional alcohol. However, it is to be understood that the prepolymers should be mainly linear and the term "substantially linear" as used herein, only includes such prepolymers in which the bifunctional reactants predominate. They are built up from polyhydric alcohols, chiefly saturated hydroxy—or dicarboxylic acids or from polyglycols and mainly saturated hydroxy—or dicarboxylic acids or from polyhydric alcohols and polyglycols and mainly saturated hydroxy—or dicarboxylic acids or from extended polyhydric alcohols, and polyglycols.

Such alcohols may be extended by reaction with bifunctional isocyanates to give a product which may be regarded as a polyhydric alcohol or polyglycol having incorporated therein a polyurethane which compounds take part in the building up process with mainly saturated hydroxy, or dicarboxylic acids. The dicarboxylic acids may also be extended such as with difunctional isocyanates and may be regarded as dicarboxylic acids having incorporated therein a polyurea which compounds take part in the building up process. Such dicarboxylic acids may take part in the building up process by reaction with polyhydric alcohols and polyglycols and extended polyhydric alcohols and polyglycols. The amount of alcohol or substance containing a function group capable of reaction with anhydrides is in excess in such a manner that the resulting prepolymer contains hydroxyl groups or other groups capable of reacting with anhydrides. Examples of suitable alcohols are ethylene glycol, glycerol, trimethylol propane, 1,2-propylene glycol, 1,3-propylene glycol, 1,3-butylene glycol, 1,4-butylene glycol, hexanetriol, diethylene glycol, triethylene glycol, 1,6-hexanediol, the methylhexane-1,6-diols, 1,4-butene glycol, thioglycol, polyethylene glycol, polypropylene glycol, polybutylene glycol.

The particular polyester and polyesteramides, with which this invention is concerned, are those formed from the reaction of a dibasic carboxylic acid with a mixture comprising a major amount of a glycol and a smaller amount of an amino alcohol or a diamine. In addition, a wide variety of complex polyesters and polyesteramides may be formed by the reaction of a plurality of acids, glycols, amino alcohols, or diamines. In the preparation of polyesters, it is possible to use ester mixtures such as a physical mixture of ethylene adipate and 1,2-propylene adipate as well as mixed esters such as that resulting from the reaction of a mixture of ethylene glycol and 1,2-propylene glycol with adipic acid. The reaction proceeds with the elimination of water to yield a long chain molecule containing a succession of ester or esteramide group in the chain. The ester and esteramide groups may be illustrated by the following radicals:

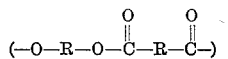

from a glycol

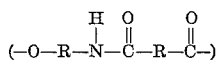

from an amino alcohol

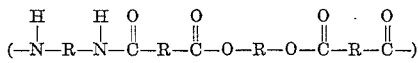

from a glycol and a diamine, R in all instances denotes a divalent organic radical such as a hydrocarbon radical or ether radical. The ether radicals in all cases are those present in the glycols derived from cyclic ethers, for instance, polyethylene glycol, polypropylene glycol, polybutylene glycol and the like. In the preparation of the polyester or polyesteramide it is possible to obtain products of varying molecular weight, depending in part upon molecular weight of the reactants and in part upon the degree of polymerization of the reactants or the number of ester or esteramide units in the polyester or polyesteramide chain. While the average molecular weight of the polyesters or polyesteramide will of course vary depending upon the particular acids, glycols, amino alcohols and diamines used. The molecular weight range for the preparation of useful products is conveniently determined by the usual methods of measuring acid numbers and hydroxyl numbers. The acid number for the starting prepolymer, that is starting polyester or polyesteramide, is held to a maximum of about 25, preferably substantially 0. The hydroxyl number is held between about 20 and 250, preferably 40 to 130.

Polyester type prepolymer formation of condensation is carried out in the usual manner by heating to temperatures of about 100 to 250° C. with slow reduction of pressure. Inert dry gas may be bubbled through the hot mixture. The employment of an excess of glycol or compound containing a functional group that will react with anhydride is preferred, whereby hydroxyl numbers or anhydride reactive functional numbers of about 20 to about 250, preferably 40 to 130, are obtained, while the carboxyl number is practically zero. Among the common functions that react with anhydrides are hydroxyl —OH, amines —NH₂, secondary amines —NHR where one of the hydrogens attached to the nitrogen atom is replaced by a hydrocarbon radical, thioglycols —SH.

A substantially dry prepolymer having groups capable of additively reacting with anyhydrides which are predominantly located at the prepolymer ends, is heated in bulk with a molar quantity of cyclic anhydride substantially equivalent to the number of prepolymer groups capable of additively reacting with anhydrides. The required temperature of heating is from about 50–150° C. The reaction proceeds more rapidly at the higher temperatures and is most useful in those cases where the cyclic anhydride is difficultly soluble in the prepolymer. The reaction may be carried out in solution in a volatile solvent inert to the reactants which is refluxed and agitated, and catalysts such as sulfuric acid, hydrochloric acid or the equivalent may be present in the reaction mixture, but are not necessary. Particularly at high temperature a dry inert gas such as nitrogen is maintained as a blanket over the reaction mixture to prevent discoloration and oxidation. This may be accomplished by passing the dry inert gas through the reaction mixture. Care must be taken at the higher temperatures to carefully watch for gelling which is a sign that crosslinking is taking place. The reaction may be carried out in bulk in a completely closed system since the starting ingredients and products derived from the reaction have a relatively low vapor pressure. Heating or refluxing is continued until the reaction is near completion as determined by reduction in the amount of functional groups that react additively with anhydrides. Where the reaction is carried out in solution in volatile solvent inert to the reactants the reaction mixture is then stripped of volatiles at temperatures sufficiently high to remove the solvent, this usually being effected in a still heated to a kettle temperature of about 80–140° C. under subatmospheric pressure while agitating the mixture.

In curing reactions of the modified prepolymer excess anhydride may increase the rate of cure while in other cases the rate of cure may be decreased. If necessary, excess anhydride may be added in the starting mix but excellent results are secured by the use of approximately equivalent molar ratios of cyclic anhydride and groups attached to the starting prepolymer which react additively to anhydrides.

The ratio of prepolymer to cyclic anhydride is determined by the equivalents of reactive groups in the prepolymer and in the cyclic anhydride. For the purposes of this invention the equivalents of cyclic anhydride groups must be used in an amount ranging from about 0.99 mole of anhydride groups to about four moles of anhydride groups per mole of groups that will react additively with anhydrides in the starting prepolymer. The preferred range of ratio of cyclic anhydride groups to prepolymer groups that react additively with anhydrides is from 1:1 to 2:1.

The physical properties of a prepolymer and of the cured polymer derived therefrom are functions of the starting constituents of the prepolymer, the location of the starting constituents of the prepolymers, the curing agent, the quantity of curing agent and the mechanism of cure of the system. For instance, the polyester built up from terephthalic acid and ethylene glycol is a high melting crystalline material and the polyester built up from diethylene glycol and adipic acid is a low melting oily liquid. If one desires a substantially linear prepolymer with certain physical properties having carboxylic acid end groups, the starting reaction is carried out in the usual manner with an excess of the starting dicarboxylic acid. The acid end group results from use of excess of the carboxylic acid chosen to give particular desired physical properties to the prepolymer. If the starting mixture for the preparation of a polyester prepolymer with acid end groups contains a mixture of dicarboxylic acids, the acid groups of which are of different reactivity and a deficit of dialcohol the resultant polyester prepolymer would contain substantially acid end groups. The acid end groups would be some mixture of acid end groups derived from various acids in the starting acid mixture. Some end groups would be of one reactivity while others would be of a different reactivity. This invention provides new modified prepolymers whose physical properties may be as desired and whose acid end groups may be chosen regardless of the composition of the starting dicarboxylic acid or mixture of starting dicarboxylic acids. The prepolymers are modified in such a manner that a single modified prepolymer may be cured by a large number of curing agents that react additively to carboxylic acids. Their rate of cure with curing agents that react additively with carboxyl groups may be accomplished at relatively low temperature and the rate of cure may be varied over a large range of time.

The physical properties of a formulation using the prepolymer of this invention is improved as the crosslinking sites are placed in an orderly fashion so that a substantially orderly array of crosslinks are formed on curing. The cured material has equal physical properties throughout its macrostructure.

Approximately equivalent molar ratios of carboxyl groups of the modified prepolymer and groups of the curing agent which will react with said carboxyl groups are preferred. The modified prepolymer carboxyl groups and the groups of the curing agent which will react with said carboxyl groups may be reacted in molar ratios within the range between 1:1 and 1:6. Harder materials result as the ratio is increased.

The following examples, in which parts are by weight, will better illustrate the present invention but should not be considered as limiting the scope.

EXAMPLE I

A typical polyester was first prepared by the condensation of adipic acid (730 parts) with diethylene glycol (256.3 parts) and ethylene glycol (186 parts). The molar ratio of dibasic acid to glycol is 1:1.1. The mixture was heated to 130–160° C. until most of the water had distilled off. The temperature was then gradually raised to 220° C., the pressure being gradually reduced to 20 mm. and nitrogen being bubbled through the melt. In about 22 hours a light colored, oily liquid was obtained. Determinations showed the acid number to be 3.7 and the hydroxyl number to be 66. To 500 grams of this polyester 57.8 grams of maleic anhydride were added, the amount being approximately equivalent to the hydroxyl groups of the polyester. This mixture was placed in a tightly sealed jar and left in an oven overnight at 100° C. The resulting modified polyester had substantially all carboxyl end groups. Tests showed that the low melting oily modified prepolymer had a ratio of maleic carboxyls to adipic carboxyls of about 17.9:1 and substantially no hydroxyl groups.

EXAMPLE II

A quantity of polyester was prepared from adipic acid and diethylene glycol according to the general method and in substantially the same ratios as shown in Example I. This polyester had an acid number of 3.7 and a hydroxyl number of 66. The polyester was divided into three parts, designated A, B, and C and processed as follows:

(1) To Part A consisting of 14.1 grams having about 0.0166 hydroxyl groups was added 1.8 grams of pyromellitic dianhydride. The mixture was heated to 150–180° C. The solution slowly increased in viscosity and after about 10 hours the viscous modified prepolymer had all acid end groups and substantially no hydroxyl groups.

(2) To part B consisting of 22.2 grams of polyester was added 2.85 grams of pyromellitic dianhydride and 15 cc. of cyclohexanone. After about 10 hours at 120–135° C. the prepolymer had become quite viscous and had substantially no hydroxyl groups.

(3) To part C consisting of 20.9 grams of the polyester, 2.68 grams of pyromellitic dianhydride was added. After a few minutes at 150–180° C. the mixture became homogeneous and was placed overnight in an oven at a temperature of 90–100° C. Examination of the resulting prepolymer showed substantially no hydroxyl groups.

EXAMPLE III

Another quantity of polyester was prepared from adipic acid and diethylene glycol according to the method and in substantially the same ratios as set out in Example I. This polyester had an acid number of 3.7 and a hydroxyl number of 66. This polyester was divided into two parts and processed as follows:

(1) Part A consisted of 37 grams of polyester having 0.04366 hydroxyl groups. Into this portion 5.6 grams of benzophenone tetracarboxylic dianhydride containing 0.035 anhydride groups was added. It dissolved in a few minutes at 160–180° C. The mix was placed in an oven and maintained at 90–100° C. for one hour whereby the viscosity gradually increased. At this time 0.95 grams of maleic anhydride (0.00966 anhydride) was stirred into the mix which was then replaced in the 90–100° C. oven to remain overnight. The modified prepolymer had carboxyl groups at its end and contained substantially no hydroxyl groups.

(2) Part B consisted of 10 grams of the polyester having 0.0118 hydroxyl groups. To this was added 1.9 grams of benzophenone tetracarboxylic dianhydride having 0.0118 anhydride groups. The mix which became homogeneous in a few minutes was placed in an oven maintained at 90–100° C. overnight. The molecular weight had increased substantially as indicated by the great increase in viscosity. The modified prepolymer when tested for hydroxyl groups had substantially no hydroxyl groups.

EXAMPLE IV

A quantity of polyester was prepared from dimethyl sebacate and 1,4-butanediol as follows: 115 parts by weight dimethyl sebacate was placed in a 1-liter 3-necked flask fitted with a stirrer, thermocouple well, gas inlet tube, distilling head and condenser. To the ester were added 55 parts of 1,4-butanediol, 0.5 part lead oxide, 0.5 part of magnesium oxide. The molar ratio of glycol to diester was 1:1.22. The mixture was heated to 150–180° C. with nitrogen bubbling through the mix for three hours. During an additional four hours of heating the pressure was gradually reduced to less than 2 mm., at which time the temperature was gradually increased to about 210–230° C. where reaction conditions were maintained overnight (eight hours). On cooling, a low melting white solid was obtained. Determinations showed the acid number to be about 2.1 and the hydroxyl number to be about 70. To 30 grams of this material having 0.0374 hydroxyls was added 6.02 grams of benzophenone tetracarboxylic dianhydride having 0.0374 anhydride groups. The mixture was stirred at 160–180° C. until homogeneous, then was placed overnight in an oven maintained at about 110° C. The molecular weight had increased as indicated by a substantial increase in viscosity over the unmodified prepolymer. Fibers which could be drawn or extended were pulled from the molten modified prepolymer.

EXAMPLE V

A quantity of polyester was prepared from dimethyl terephthalate and ethylene glycol according to the method and substantially the same ratios as shown for the polyester described in Example IV. This polyester which had substantially no acid groups was mixed with a substantially hydroxyl terminated polyester prepared from dimethyl sebacate and diethylene glycol in weight ratios of 80:20 and 50:50. Each of the two mixtures were reacted with benzophenone tetracarboxylic acid dianhydride in equivalent anhydride to equivalent hydroxyl quantities. Fibers which could be drawn or extended were pulled from the molten modified prepolymer mixtures.

EXAMPLE VI

A quantity of polyester was prepared from dimethyl terephthalate and ethylene glycol in accordance with the method set out hereinbefore. This polyester had substantially no acid groups. A polyamide was prepared from 1,6-hexamethylene and adipic acid. The two prepolymers were mixed together in two batches one in weight ratios of 80 polyester prepolymer to 20 polyamide prepolymer and the other 50:50. Each of these two mixtures were reacted with benzophenone tetracarboxylic dianhydride in equivalent anhydride to equivalent hydroxyl plus amine quantities. Fibers which could be drawn or extended were pulled from the molten modified prepolymer mixtures.

EXAMPLE VII

A quantity of polyester (30 grams), having a hydroxyl number of 50 and an acid number of 2, were prepared from adipic acid, diethylene glycol and ethylene glycol. Another quantity of a polyester (20 grams) was prepared from adipic acid and diethylene glycol having a hydroxyl number of 66 and an acid number of 3.7. The two polyesters were mixed together and heated for a few minutes to a temperature of about 160–180° C. while 5.48 grams of pyromellitic dianhydride (having 0.0503 cyclic anhydride) were stirred in until a homogenous mixture resulted. The mixture was placed overnight in an oven set at 90 to 100° C. The molecular weight had increased significantly as evidenced by the greatly increased viscosity. Determinations indicated substantially no hydroxyl groups were present.

In addition to the examples set out above Table I shown below tabulates selected examples of the prepolymer composition and the cyclic anhydride used to prepare the modified prepolymers according to this invention.

fied prepolymers produced by the process of this invention. The prepolymer and phosphine oxide mixes were poured into aluminum cups and placed in an oven maintained at 50–60° C. for two days. The resultant rubbery products exhibited superior physical properties. Bend strength was excellent (bent at a 90° angle more than 20 times without rupture). Elastic recovery of the samples prepared ranged from acceptable to very good. "Very good" means stretching greater than 150% without rup-

TABLE I

| Example Number | Starting Prepolymer | Acid Number | Hydroxyl Number | Cyclic Anhydride | Hydroxyls Remaining substantially 0 |
|---|---|---|---|---|---|
| 1 | Ethylene glycol and adipic acid | 3.5 | 43 | PMDA | 0 |
| 2 | do | 3.5 | 43 | Maleic | 0 |
| 3 | do | 3.5 | 43 | Phthalic | 0 |
| 4 | do | 25 | 91 | Succinic | 0 |
| 5 | do | 25 | 91 | Chloromaleic | 0 |
| 6 | do | 25 | 91 | Trimellitic | 0 |
| 7 | Proylene glycol 1, 2 and adipic acid | 21 | 62 | Phthalic | 0 |
| 8 | do | 21 | 62 | Maleic | 0 |
| 9 | do | 21 | 62 | Succinic | 0 |
| 10 | do | 3.5 | 68 | Phthalic | 0 |
| 11 | do | 3.5 | 68 | Maleic | 0 |
| 12 | do | 3.5 | 68 | Succinic | 0 |
| 13 | do | 0.5 | 186 | PMDA [a] | 0 |
| 14 | Ethylene glycol (from 60 to 80 mol percent), propylene glycol 1,3 (from 20 to 40 mol percent) and adipic acid. | 18.5 | 129 | Maleic | 0 |
| 15 | do | 18.5 | 129 | Phthalic | 0 |
| 16 | do | 18.5 | 129 | Chloromaleic | 0 |
| 17 | Diethylene glycol and adipic acid | 0.14 | 262 | Phthalic | 0 |
| 18 | do | 0.14 | 262 | Maleic | 0 |
| 19 | do | 0.14 | 262 | PMDA | 0 |
| 20 | do | 0.14 | 262 | Chloromaleic | 0 |
| 21 | do | 3.7 | 66 | Maleic | 0 |
| 22 | do | 3.7 | 66 | Phthalic | 0 |
| 23 | do | 3.7 | 66 | Chloromaleic | 0 |
| 24 | do | 3.7 | 66 | PMDA | 0 |
| 25 | do | 3.7 | 66 | Trimellitic | 0 |
| 26 | do | 3.7 | 66 | BPT [b] | 0 |
| 27 | 1, 2-propylene glycol and adipic acid | 0.3 | 90 | Phthalic | 0 |
| 28 | do | 0.3 | 90 | Succinic | 0 |
| 29 | do | 0.3 | 90 | Maleic | 0 |
| 30 | Diethylene glycol (from 22 to 45 mol percent), ethylene glycol (from 55 to 78 mol percent) and adipic acid. | 13.5 | 82 | do | 0 |
| 31 | do | 13.5 | 82 | Trimellitic | 0 |
| 32 | do | 13.5 | 82 | PMDA | 0 |
| 33 | do | 16.8 | 124 | Chloromaleic | 0 |
| 34 | do | 16.8 | 124 | Succinic | 0 |
| 35 | do | 16.8 | 124 | Phthalic | 0 |
| 36 | do | 2 | 50 | Maleic | 0 |
| 37 | do | 2 | 50 | Phthalic | 0 |
| 38 | do | 2 | 50 | Succinic | 0 |
| 39 | do | 2 | 50 | Chloromaleic | 0 |
| 40 | do | 2 | 50 | PMDA | 0 |
| 41 | Diethylene glycol (from 12.5 to 20 mol percent), ethylene glycol (from 60 to 75 mol percent), 1, 2-propylene glycol (from 12.5 to 20 mol percent) and adipic acid. | 14.6 | 86 | Maleic | 0 |
| 42 | do | 14.6 | 86 | Succinic | 0 |
| 43 | do | 14.6 | 86 | Phthalic | 0 |
| 44 | do | 14.6 | 86 | Chloromaleic | 0 |
| 45 | Diethylene glycol and dimethyl sebacate | 2.1 | 70 | BPT | 0 |
| 46 | do | 2.1 | 70 | Maleic | 0 |
| 47 | do | 2.1 | 70 | PMDA | 0 |
| 48 | 1, 4-butanediol and dimethyl sebacate | 2.1 | 66 | BPT | 0 |
| 49 | do | 2.1 | 66 | Maleic | 0 |
| 50 | do | 2.1 | 66 | Trimellitic | 0 |
| 51 | 1, 4-butanediol and adipic acid | 0.4 | 220 | Maleic | 0 |
| 52 | 1, 4-butynediol and sebasic acid | 0.1 | 200 | do | 0 |
| 53 | Polybutylene glycol and adipic acid | 3.6 | 19 | do | 0 |

[a] PMDA is pyromellitic dianhydride. [b] BPT is benzophenone tetracarboxylic dianhydride.

The ingredients found in the examples in Table I above are processed in accordance with the procedure described in Examples I to VII herein. All the products are versatile, storable cyclic anhydride modified prepolymers.

The prepolymers of this invention can be cured by a large variety of agents which react with carboxyl groups. It was found that if the prepolymer had acid end groups derived from cyclic anhydrides such as maleic, itaconic, muconic and the like, that even more variety is available as these prepolymers will crosslink addition polymerization cast systems like styrene, methylmethacrylate, vinyl acetate and the like.

Curing agents which react with carboxyl groups of the modified prepolymers include diglycidyl ether of bisphenol A, limonene dioxide, dicyclopentadiene dioxide, vinylcyclohexane dioxide, 3,4-epoxy-6-methylcyclohexylmethyl 3,4-epoxy-6-methylcyclohexane carboxylate hereinafter called epoxide 201 and the like. Others are listed herein.

Various quantities of tris-1-(2-methyl)aziridinyl phosphine oxide were also used to cure the anhydride moditure and "acceptable" means stretching greater than 50% without rupture.

Curing agents which were used successfully to cure the carboxyl terminated cyclic anhydride modified prepolymers of the present invention at particular rates and particular temperatures included the following:

Diglycidyl ether of bisphenol A.
Limonene dioxide.
Dicyclopentadiene dioxide.
Vinylcyclohexane dioxide.
3,4-epoxy-6-methylcyclohexylmethyl-c,4-expoxy-6-methylcyclohexane carboxylate.
2,6(2,3 epoxypropyl)phenyl glycidyl ether.
N,N'(2,3 epoxypropyl)-para-aminophenyl glycidyl ether.
Tris-1,3-5-(2-methylaziridinylpropionyl)-hexahydro-S-triazine.
Tris-(2-ethylaziridinyl)-S-triazine.
Tris-1-(2-methyl)aziridinyl phosphine oxide.
Tris-1-(2-alkyl)aziridinyl derivatives of trimesic acid.
Toluene 2,4-diisocyanate.

Hexamethylene diisocyanate.
1,5-naphthylene diisocyanate.
Nitrobenzidine diisocyanate.
Triphenylmethane triisocyanate.
Triisocyanate from 2-aminobenzidine.
Tetraisocyanate from 3-3'-dimethyl 2,4,2',4'-tetraamino-diphenylmethane.
Diisocyanates from 4,4'-diaminodiphenylmethane.
Diisocyanate from the methyl substituted 4,4'-diaminodiphenylmethane.

The unsaturated cyclic anhydride modified prepolymers will undergo addition copolymerization. Unsaturates such as styrene, methyl methyl methacrylate and vinyl acetate were added in a ratio of 1:1 and cured at room temperature using a peroxide-cobalt naphthenate catalyst system. The physical properties of the products varied from hard, hard-tough, tough, tough-flexible, to flexible. Thus, addition copolymerization cured modified prepolymers provide great versatility in physical properties.

Obviously many modifications and variations of the present invention are possible in the light of the above teachings. It is therefore to be understood that within the scope of the appended claim the invention may be practiced otherwise than as specifically described.

What is claimed is:

1. A polymeric resin which consists of a mixture of 30 grams of a first polyester prepolymer and 20 grams of a second polyester prepolymer and about 5.5 grams of pyromellitic dianhydride; said first polyester prepolymer consisting of the reaction product of adipic acid, diethylene glycol and ethylene glycol in a ratio of dibasic acid to glycol of 1:1.1 and having an acid number of 3.7 and a hydroxyl number of 66; and said second prepolymer consisting of the reaction product of adipic acid and diethylene glycol in a ratio of acid to glycol of 1:1.1 and having an acid number of 3.7 and a hydroxyl number of 66.

References Cited

UNITED STATES PATENTS

| | | | |
|---|---|---|---|
| 2,683,131 | 7/1954 | Cass | 260—835 |
| 2,830,031 | 4/1958 | Fisch | 260—835 |
| 3,242,142 | 3/1966 | Hyde | 260—835 |
| 3,397,254 | 8/1968 | Wynstra et al. | 260—835 |
| 2,889,312 | 6/1959 | Szayna | 260—861 |
| 2,904,533 | 9/1959 | Carlston et al. | 260—861 |
| 3,042,650 | 7/1962 | Bock Stahler | 260—861 |
| 3,196,131 | 7/1965 | Mayer et al. | 260—861 |
| 3,345,339 | 10/1967 | Parker et al. | 260—861 |

FOREIGN PATENTS 91,490   10/1961   Denmark.

SAMUEL H. BLECH, Primary Examiner

P. LIEBERMAN, Assistant Examiner

U.S. Cl. X.R.

260—78.4, 835, 858, 861, 75